Sept. 22, 1959  T. A. MATTHEWS II  2,905,380
CENTRIFUGAL SEPARATION

Filed Nov. 19, 1956  2 Sheets-Sheet 1

INVENTOR.
T.A. MATTHEWS, II

BY *Hudson & Young*

ATTORNEYS

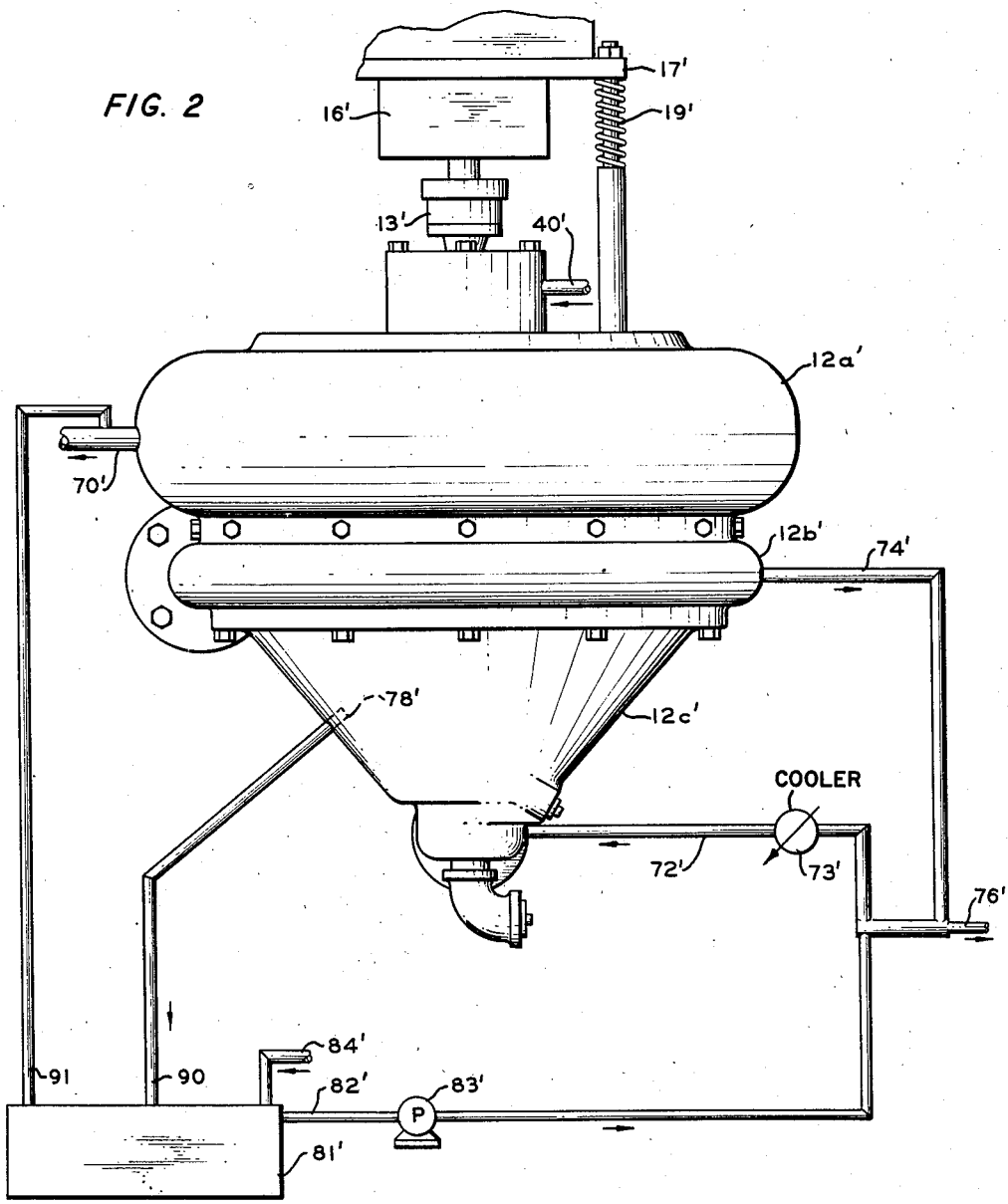

United States Patent Office 2,905,380
Patented Sept. 22, 1959

2,905,380

CENTRIFUGAL SEPARATION

Thomas A. Matthews II, Bartlesville, Okla., assignor to Phillips Petroleum Company, a corporation of Delaware Application November 19, 1956, Serial No. 622,879

6 Claims. (Cl. 233—27)

This invention relates to a centrifuge which is adapted to separate solids from fluids at high pressures. Another object is to provide a method of separtinag catalyst particles from liquids.

Centrifuges of various configurations are known in the art for separating fluid mixture into constituents of different specific gravities. In some operations, it is necessary to make such separations at pressures substantially above atmospheric. For example, in the catalytic polymerization of olefins in the presence of a diluent or solvent, it is necessary to separate the produced polymer from the catalyst particles. The polymerization reaction effluent normally is at a sufficiently high temperature to retain the polymer in solution in a hydrocarbon solvent. The pressure must be sufficiently high to retain the solvent in a liquid state. It has been found that commercially available centrifuges are not capable of separating the catalyst from the polymer satisfactorily at elevated pressures. The housings of these centrifuges generally are not sufficiently strong to withstand high pressures. Furthermore, there is often a tendency for the liquid within the centrifuges to vaporize, with a resulting increase in pressure.

In accordance with the present invention an improved centrifuge is provided which is capable of separating fluid mixtures at elevated pressures. A vent passage is provided in the centrifuge housing so that the interior of the centrifuge is in communication with a region exterior of the housing. This serves to equalize any excess pressure differential which may develop between the centrifuge interior and its surroundings from the liquid vaporizing within the centrifuge. Means are provided for collecting any liquid which may spill through the vent opening and for returning such liquid to the interior of the centrifuge through the underflow recycle conduit. This permits the equalization of excess pressures without loss of liquid product. In one embodiment of this invention, a second fluid tight housing surrounds the centrifuge housing. This second housing is capable of withstanding the pressure of the fluid mixture being separated so that the centrifuge housing need not be sufficiently strong to prevent fluid leakage. The spilled liquid is collected in the bottom of the second housing and returned to the centrifuge through the underflow recycle conduit. Means are also provided in accordance with this invention for cooling the fluid directed through the underflow recycle conduit in order to prevent excessive vaporization within the centrifuge.

Accordingly, it is an object of this invention to provide an improved centrifuge which is capable of separating fluid mixtures at high pressures.

Another object is to provide apparatus for recovering and recycling liquid spilled from a centrifuge.

Another object is to provide a method of separating solids from liquids.

A further object is to provide an underflow and overflow pressure equalizing system for a centrifuge.

Other objects, advantages and features of this invention should become apparent from the following detailed description which is taken in conjunction with the accompanying drawing in which:

Figure 2 is a schematic representation of a second embodiment of the centrifuge of this invention.

Figure 1:
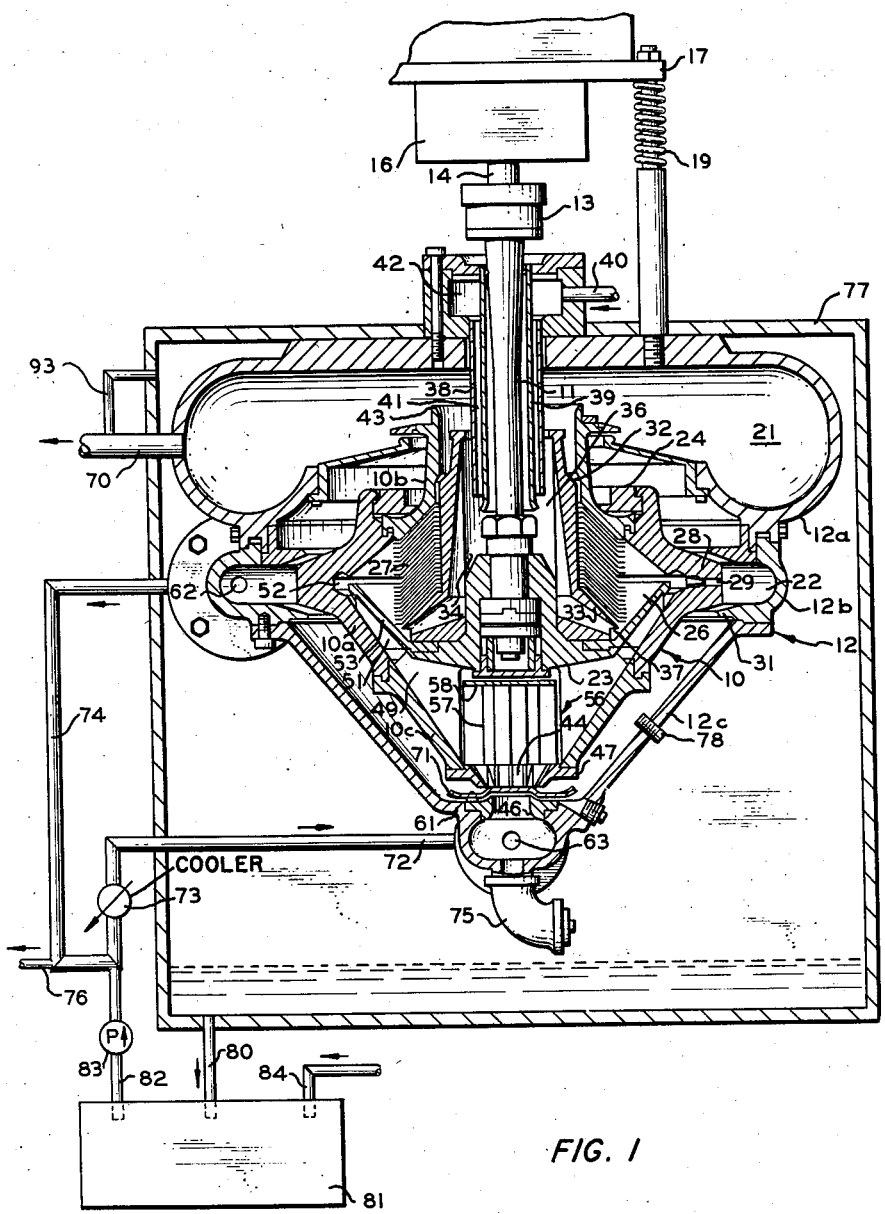
Figure 1 is a schematic representation of a first embodiment of the centrifuge of this invention.

Referring now to the drawing in detail and to Figure 1 in particular, there is shown a centrifuge which comprises a rotor 10 that is carried by a vertical shaft 11 and disposed within a stationary housing 12. The rotor shaft 11 is connected by a coupling 13 to a vertical shaft 14 which is connected to a source of power 16, such as an electric motor. Power source 16 is mounted by a ring 17 which is supported on a spring mounting 19.

Housing 12 is conveniently formed of a plurality of separable sections 12a, 12b, and 12c. Section 12a forms a volute chamber 21 which receives the centrifugally separated overflow. Section 12b forms a volute chamber 22 which receives the underflow or heavier separated material.

The body of rotor 10 likewise is conveniently made of a number of separable annular sections. These include a main section 10a, and upper and lower conical shaped sections 10b and 10c, respectively. Section 10a includes an inner structure 23 which is attached to the lower end of rotor shaft 11. Sections 10a and 10b are retained together by suitable means, such as expansible clamping ring 24. Within the separating chamber 26 of the rotor, there is located a group of spaced separating disks 27, such as are commonly employed in centrifuges. Mounted within the outer peripheral wall 28 of the main body section 10a are spaced nozzles 29, only one of which is shown, which are provided with discharge orifices that are directed backwardly with respect to the direction of rotation. The annular peripheral wall 28 of the rotor body section 10a is located within a diverging portion 31 of housing section 12b.

A sleeve member 32 is disposed inside the group of disks 27 in order to supply the fluid mixture to be separated to the rotor assembly. The lower portion 33 of member 32 is outwardly flared. The inner wall of member 32 is provided with circumferentially spaced vanes 34 which extend from the lower side of flared portion 33 to the upper end of member 32. Member 32 thus forms a passage 36 which receives the feed material to be separated. This passage connects with main chamber 26 through a passage 37 that is formed between the flared portion 33 and the adjacent wall of structure 23. Concentric tubes 38 and 39 surround shaft 11 and extend upwardly from passage 36. The annular space 41 between these tubes connects at its upper end with a chamber 42 which receives the feed fluid mixture from an inlet conduit 40.

The rotor section 10b extends upwardly beyond member 32 and has an upper lip 43 for the discharge of overflow or the lighter centrifugally separated material. This overflow material is received in the annular chamber or volute 21 and is removed through an overflow discharge conduit 70.

The lower section 10c of the rotor forms an impeller for the return of heavier centrifugally separated underflow material back into the rotor. To this end, the lower end of section 10c is provided with an axially and downwardly facing opening 44. This opening is directly above a nozzle 46 which is carried by the lower portion of housing 12. Nozzle 46 serves to direct a jet of the underflow material upwardly into the impeller through opening 44. Opening 44 is formed in a ring 47 which is clamped to the lower section 10c of the rotor. Within rotor section 10c and above ring 47 are radially extending webs or vanes 49 which serve to impart rotor velocity to the returned fluid. The material passing through the spaces between the vanes 49 moves upwardly through passage 51 to the outer annular space 52 which communicates with the main separating chamber 26 and with the discharge nozzles 29. The inner wall of passage 51 is defined by a conically shaped member 53 which is upwardly divergent and which is attached to structure 23. A vane assembly 56 is provided in the region immediately above ring 47. This assembly comprises a plurality of circumferentially spaced and vertically extending vanes 57 which have their lower ends attached to ring 47 and their upper ends attached to a disk 58. These vanes are inclined toward the direction of rotation so that material contacted by these vanes is forced outwardly. The centrifuge is provided with a drain 75.

In the operation of this centrifuge, some material discharged from the rotor invariably spills from the rotor instead of being delivered into chambers 21 and 22. The lower section 12c of the housing is conically shaped so that this spilled material is collected near the lower end of the rotor. The lower end 61 of housing 12 is fitted with nozzle 46 adjacent this region. A portion of the underflow product which is removed through a conduit 74 is returned to nozzle 46 through a conduit 72 which enters the housing through an opening 63. This returned material is discharged upwardly through nozzle 46 into rotor 10. Considerable pressure is developed within volute 22 so that the underflow material discharges upwardly through nozzle 46 with considerable velocity and in the form of a directed jet. This jet of material sucks the spilled material in housing 12c back into rotor 10.

The centrifuge thus far described normally is operated continuously with a feed stream being supplied by means of inlet conduit 40. This material flows from chamber 42 downwardly into separating chamber 26. The overflow material continuously discharges over lip 43 into volute 21, from which it is removed through conduit 70. The heavier centrifugally separated material or underflow discharges continuously from nozzles 29 into volute 22, from which it is removed through conduit 74. The major part of this underflow material is continuously recycled back into the centrifuge rotor through the return conduit 72. Any spilled material within the housing is sucked inwardly and merged with the upwardly discharge jet through nozzle 46. The remainder of the underflow material removed through conduit 74 is discharged from the centrifuge through an outlet conduit 76.

As previously mentioned, it is sometimes desirable to operate the centrifuge under substantial pressure. This is accomplished in accordance with the present invention by enclosing the entire centrifuge by a fluid tight housing 77. This housing has sufficient strength to withstand the vapor pressure of the fluid mixture being separated or pressures in excess of such vapor pressure. It has been discovered that a portion of the liquid within housing 12 tends to vaporize, which substantially increases the pressure within housing 12. In order to reduce this pressure, one or more vents 78 are formed in housing section 12c. These vents communicate between the interior of housing 12 and the interior of housing 77. Any liquid which escapes through vent 78 accumulates in the bottom of housing 77 and is removed through a conduit 80 which communicates with a surge tank 81. This liquid is withdrawn through a conduit 82, which has a pump 83 therein, and is returned to the centrifuge through recycle conduit 72. This prevents loss of the spilled liquid and provides additional refluxing action. A conduit 93 equalizes pressures between conduit 70 and housing 77. If desired, housing 77 can be filled with a gas at a pressure equal to or greater than the pressure of the fluid mixture being separated. This tends to prevent vaporization within the centrifuge.

In order to reduce the vaporization within housing 12, a cooler 73 is provided in recycle conduit 72. This cools the recycled fluid so that less vaporization takes place within the centrifuge. In some operations, it is desirable to introduce additional solvent into the recycle system in order to maintain the recycle stream flowable. This is conveniently accomplished in accordance with this invention by means of a conduit 84 which permits the additional solvent to be added to surge tank 81, from which it is recycled back to the centrifuge.

In Figure 2 of the drawing, there is shown a second embodiment of the centrifuge of this invention which is generally similar to that of Figure 1 and wherein corresponding elements are designated by like primed reference numerals. Housing 12 of the centrifuge of Figure 2 is constructed of stronger materials which are capable of withstanding the pressure of the fluids being separated. This eliminates the need for housing 77. A conduit 90 extends between vent 78' and surge tank 81' so that liquid which spills from housing 12 is accumulated in tank 81'. Pressure equalization between the underflow and overflow volutes is accomplished by means of a conduit 91 which communicates between overflow discharge conduit 70' and surge tank 81'. The interior of housing 12 adjacent vent 78 is thus in communication with overflow volute 21. The apparatus of Figure 2 is otherwise generally similar to that shown in Figure 1.

As a specific example of the operation of the centrifuge of this invention, reference is made to the separation of catalyst from polymer in a polyethylene polymerization process. The feed stream to the centrifuge has a composition as follows:

| Component: | Amount (pounds/day) |
|---|---|
| Methane | 2 |
| Ethylene | 1,364 |
| Ethane | 109 |
| Cyclohexane | 4,473,286 |
| Polyethylene | 186,544 |
| Polymer soluble in cyclohexane at room temperature | 4,039 |
| Catalyst [1] | 2,212 |
| Water | 634 |

[1] A 20 to 60 mesh silica-alumina composite containing about 2.5 weight percent chromium.

This feed mixture is supplied to the centrifuge at approximately 300° F. and at a pressure in the range of 78 to 110 p.s.i.a. The overflow composition is as follows:

*Overflow*

| Component: | Amount (pounds/day) |
|---|---|
| Methane | 2 |
| Ethylene | 1,136 |
| Ethane | 91 |
| Cyclohexane | 3,726,900 |
| Polyethylene | 152,202 |
| Soluble polymer | 3,366 |
| Catalyst | 15 |
| Water | 528 |

The remainder is removed as underflow and subsequently passed to a second centrifuge to remove additional catalyst.

From the foregoing, it should be evident that there is provided in accordance with this invention an improved centrifuge which is capable of separating fluid mixtures at elevated pressures. While the invention has been described in conjunction with a specific centrifuge for purposes of illustration, it should be evident that the invention is not restricted thereto. The invention resides primarily in providing means for equalizing pressure between the underflow and overflow volutes of a centrifuge without entrainment of vapor and catalyst from underflow to overflow, and for collecting liquid which may spill from the centrifuge and recycling this liquid back to the underflow recycle loop of the centrifuge.

While the invention has been described in conjunction

What is claimed is:

1. A centrifuge comprising a housing, a rotor disposed in said housing, said rotor having at least one discharge nozzle at the periphery thereof, means to introduce a mixture to be separated into said rotor, an underflow volute positioned to receive the discharge through said nozzle, an overflow volute positioned to receive the overflow from said rotor at a region nearer the axis of said rotor than is said nozzle, said housing having an opening therein which communicates between a region exterior of said housing and an interior region of said housing which is in communication with the interior of said rotor, means communicating between said overflow volute and said region exterior of said housing to equalize pressure therebetween, and conduit means to pass liquid removed from said housing through said opening to a region within said rotor.

2. A centrifuge comprising a first housing, a rotor disposed in said first housing, said rotor having at least one discharge nozzle at the periphery thereof, means to introduce a mixture to be separated into said rotor, an underflow volute positioned to receive the discharge through said nozzle, an overflow volute positioned to receive the overflow from said rotor at a region nearer the axis of said rotor than is said nozzle, said first housing having an opening therein which communicates between a region exterior of said first housing and an interior region of said first housing which is in communication with the interior of said rotor, a second fluid-tight housing enclosing said first housing and said volutes to collect liquid removed from said first housing through said opening, and means communicating between said overflow volute and the interior of said second housing to equalize pressure therebetween.

3. The centrifuge of claim 2 further comprising conduit means to pass liquid from the interior of said second housing to a region within said rotor.

4. A centrifuge comprising a housing, a rotor disposed in said housing, said rotor having at least one discharge nozzle at the periphery thereof, means to introduce a mixture to be separated into said rotor, an underflow volute positioned to receive the discharge through said nozzle, an overflow volute positioned to receive the overflow from said rotor at a region nearer the axis of said rotor than is said nozzle, said housing having an opening therein which communicates between a region exterior of said housing and an interior region of said housing which is in communication with the interior of said rotor, means communicating between said overflow volute and said region exterior of said housing to equalize pressure therebetween, first conduit means communicating between said underflow volute and a region within said rotor to pass a portion of the material discharged through said nozzle into said underflow volute back to said rotor, and second conduit means to pass liquid removed from said housing through said opening to a region within said rotor.

5. A centrifuge comprising a housing, a rotor disposed in said housing, said rotor having at least one discharge nozzle at the periphery thereof, means to introduce a mixture to be separated into said rotor, an underflow volute positioned to receive the discharge through said nozzle, an overflow volute positioned to receive the overflow from said rotor at a region nearer the axis of said rotor than is said nozzle, said housing having an opening therein which communicates between a region exterior of said housing and an interior region of said housing which is in communication with the interior of said rotor, conduit means to pass liquid removed from said housing through said opening to a region within said rotor, and conduit means communicating between said opening and said overflow volute to equalize pressure.

6. A centrifuge comprising a housing, a rotor disposed in said housing, said rotor having at least one discharge nozzle at the periphery thereof, means to introduce a mixture to be separated into said rotor, an underflow volute positioned to receive the discharge through said nozzle, an overflow volute positioned to receive the overflow from said rotor at a region nearer the axis of said rotor than is said nozzle, said housing having an opening therein which communicates between a region exterior of said housing and an interior region of said housing which is in communication with the interior of said rotor, means communicating between said overflow volute and said region exterior of said housing to equalize pressure therebetween, first conduit means communicating between said underflow volute and a region within said rotor to pass a portion of the material discharged through said nozzle into said underflow volute back to said rotor, second conduit means to pass liquid removed from said housing through said opening to a region within said rotor, and means associated with said second conduit means to cool the material passed therethrough.

References Cited in the file of this patent

UNITED STATES PATENTS

| 2,335,420 | Jones | Nov. 30, 1943 |
| 2,559,453 | Merrill et al. | July 3, 1951 |
| 2,678,159 | Ellis | May 11, 1954 |
| 2,760,889 | Peltzer | Aug. 28, 1956 |